E. A. PARKER.
SAW SET.
APPLICATION FILED MAY 4, 1909.
946,704.
Patented Jan. 18, 1910.
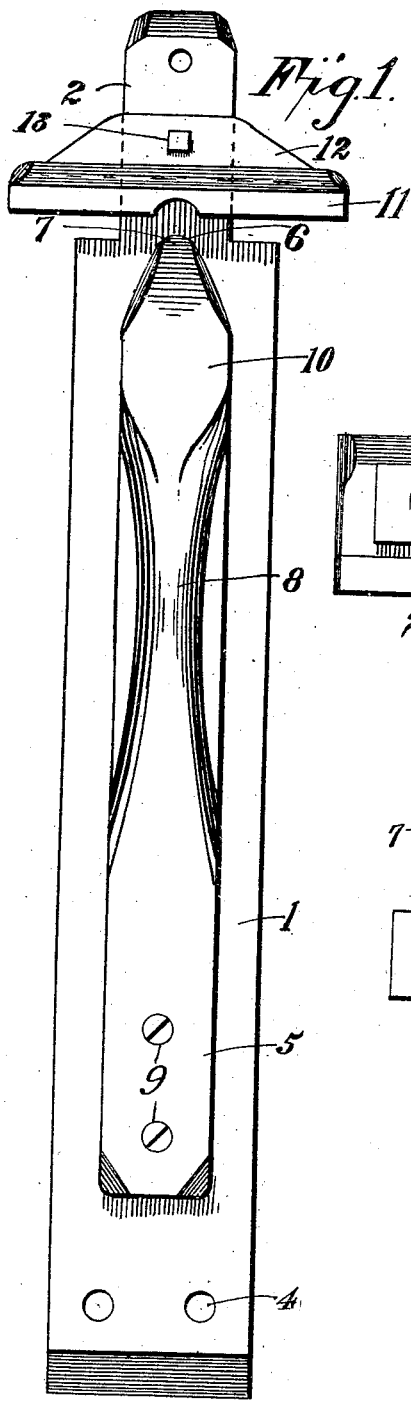
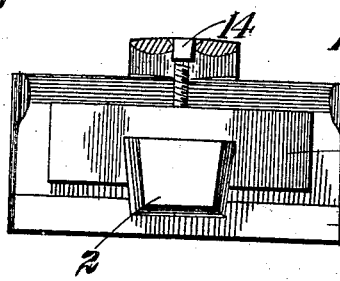
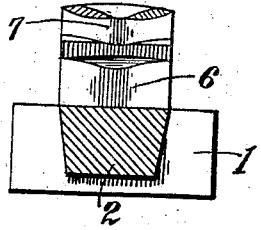
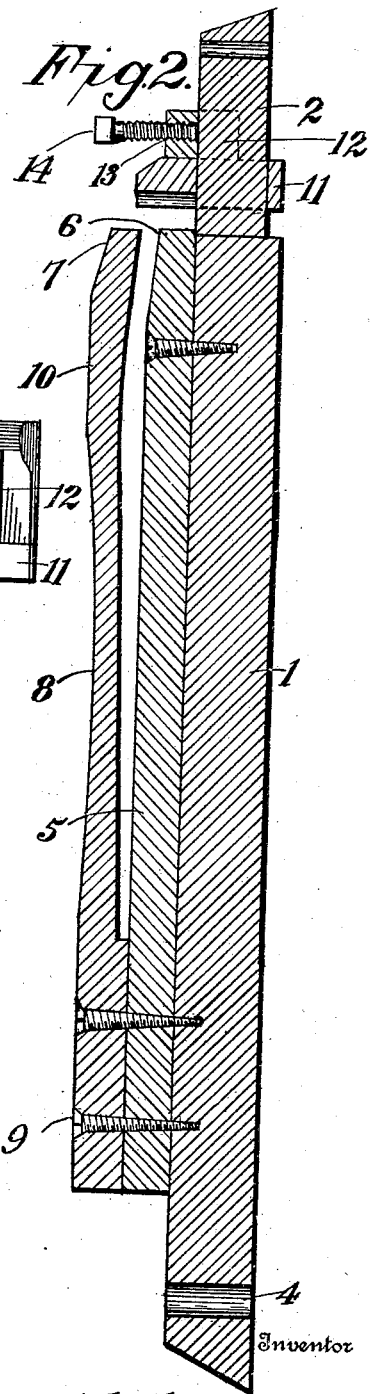
Witnesses
Alton Fowler.
E. M. Ricketts
Inventor
E. A. Parker.
By Watson E. Coleman
Attorney

UNITED STATES PATENT OFFICE.

EDWARD A. PARKER, OF BELLINGHAM, WASHINGTON.

SAW-SET.

946,704.

Specification of Letters Patent.     Patented Jan. 18, 1910.

Application filed May 4, 1909.   Serial No. 493,894.

*To all whom it may concern:*

Be it known that I, EDWARD A. PARKER, a citizen of the United States, residing at Bellingham, in the county of Whatcom and State of Washington, have invented certain new and useful Improvements in Saw-Sets, of which the following is a specification, reference being had to the accompanying drawings.
This invention relates to improvements in saw sets, and consists of the novel construction, combination and arrangement of parts hereinafter fully described and claimed.

The object of the invention is to provide a simple and practical saw set which may be produced at a small cost and applied to any support, which may be adjusted to operate on different size saws and by means of which the saw teeth may be quickly and uniformly set.

The above and other objects of the invention are attained in its preferred embodiment illustrated in the accompanying drawings, in which—
Figure 1 is a front elevation of the improved saw set; Fig. 2 is a vertical section; Fig. 3 is a top plan view; and Fig. 4 is a horizontal section.

The invention comprises a substantially rectangular base 1 having one of its ends reduced by removing the opposite side portions and rear portion to provide a guide stem 2. The side edges of the latter are beveled inwardly so that it is of dovetail shape in cross section, as shown in Fig. 4. Apertures 4 are provided adjacent the extremities of the body 1 and its guide stem 2 for the reception of screws or other fastenings, whereby it may be secured to a suitable support.

Secured longtiudinally and centrally on the outer face of the base 1 is a bar 5 having one of its ends reduced or tapered to provide a stationary die 6. Co-acting with the latter is a punch jaw 7 formed integral with the free end of a resilient bar 8. The latter has a rectangular end secured by screws or similar fastenings 9 to one end of the bar 5, and its inner or under face is reduced to provide between it and the bar 5 a space for the reception of a saw blade. The outer face of the free end of the punch bar 8 is enlarged and flattened, as shown at 10, to provide a head against which a hammer or other tool may be struck to force the setting punch or jaw 7 against the saw tooth which is placed on the stationary die 6. The intermediate portion of the resilient bar 8 has its outer and side faces reduced, as shown in Figs. 1 and 2 so as to render it more resilient.

11 denotes a gage adjustably mounted on the stem 2 and disposed opposite the ends of the die 6 and punch 7. This gage is in the form of a rectangular plate disposed transversely with respect to the base 1 and having a central opening shaped to slidably receive the stem 2. The inner face of the gage plate 11 is flat for engagement by a plurality of saw teeth, and its outer face is formed with an integral lug 12 having a screw threaded opening 13 for a set screw 14. The latter is adapted to clamp the gage plate in adjusted position on the guide stem 2 so that all of the teeth of the saw will be uniformly set.

In using the invention the saw blade is placed in the space between the bar 5 and the punch bar 8, and the gage plate is then adjusted. The teeth of the saw engage the flat inner face of the gage plate and as the saw is shifted to bring its different teeth opposite the die 6, the part 10 of the punch is struck with a hammer to set the teeth.

From the foregoing it will be seen that the invention provides an exceedingly simple and practical saw set which may be produced at a small cost, readily applied to any support, easily adjusted to accommodate saws of different sizes and easily operated to effectively and uniformly set the teeth of the saw.

Having thus described the invention what is claimed is:

The herein described saw set comprising an attaching base bar having one of its ends reduced on opposite sides and at its back to provide a reduced dovetail guide stem, a centrally and longitudinally arranged bar upon the front face of the base bar and having one of its ends beveled to provide a stationary die, a resilient punch bar having its intermediate portion reduced and its bottom recessed from one end to a point adjacent its other end, the last mentioned end being secured to one end of the second mentioned bar, whereby a saw-receiving space is provided between the two bars, the free end of the resilient punch bar having its inner face inclined to provide a punch, and its outer face enlarged to provide a striking head, a transversely disposed gage plate having a central opening to receive said guide stem, whereby said plate may slide toward and from the die and punch, and a set screw carried by said gage plate and adapted to impinge against said stem to retain the gage plate in adjusted position.

In testimony whereof I hereunto affix my signature in the presence of two witnesses.

EDWARD A. PARKER.

Witnesses:
 OLIVER P. BROWN,
 VIRGIL PINNGES.